United States Patent [19]

Saito

[11] E Re. 31,503

[45] Reissued Jan. 24, 1984

[54] TRACKWAY AND POWERED VEHICLE WITH CHANGEABLE COVERS

[75] Inventor: Makoto Saito, Tokyo, Japan

[73] Assignee: Tomy Kogyo Co., Inc., Tokyo, Japan

[21] Appl. No.: 167,192

[22] Filed: Jul. 9, 1980

Related U.S. Patent Documents

Reissue of:

[64] Patent No.: 4,109,412
Issued: Aug. 29, 1978
Appl. No.: 755,868
Filed: Dec. 30, 1976

[30] Foreign Application Priority Data

Jun. 18, 1976 [JP] Japan ..... 51/80873

[51] Int. Cl.[3] ..... A63H 19/00
[52] U.S. Cl. ..... 46/216; 46/223
[58] Field of Search ..... 46/201, 202, 216, 218, 46/257-261

[56] References Cited

U.S. PATENT DOCUMENTS

| | | | |
|---|---|---|---|
| 2,876,584 | 3/1959 | Smith | 46/214 |
| 3,421,257 | 1/1969 | Ostrander | 46/202 |
| 3,483,653 | 12/1969 | Genin | 46/202 X |
| 3,589,058 | 6/1971 | Labat | 46/249 |
| 3,589,063 | 6/1971 | Genin | 46/202 X |
| 3,670,450 | 6/1972 | Morosawa . | |
| 3,740,895 | 6/1973 | Nagasaka | 46/202 |
| 4,045,908 | 9/1977 | Ensmann et al. | 46/216 |

FOREIGN PATENT DOCUMENTS

| | | | |
|---|---|---|---|
| 2205825 | 5/1974 | France | 46/216 |
| 46-675312 | of 1971 | Japan . | |
| 49-1075588 | of 1974 | Japan . | |
| 50-1127800 | of 1975 | Japan . | |
| 529675 | 11/1940 | United Kingdom | 46/216 |
| 877515 | 9/1961 | United Kingdom | 46/216 |
| 887806 | 1/1962 | United Kingdom | 46/216 |
| 1277317 | 6/1972 | United Kingdom | 46/216 |
| 1293300 | 10/1972 | United Kingdom | 46/202 |

*Primary Examiner*—F. Barry Shay
*Attorney, Agent, or Firm*—Staas & Halsey

[57] ABSTRACT

A toy train and trackway wherein the trackway is provided with a section which has a base and upstanding side walls provided with supporting surfaces which include portions that are parallel to the base and portions that slope downwardly toward the base, a powered vehicle having wheels that move along the trackway and the base of the section and which is provided with outwardly extending flanges, and a plurality of covers of varying configuration for the vehicle, each being provided with flanges extending outwardly therefrom which are oriented to engage the supporting surfaces of the side walls of the section and the flanges of the vehicle.

15 Claims, 9 Drawing Figures

TRACKWAY AND POWERED VEHICLE WITH CHANGEABLE COVERS

Matter enclosed in heavy brackets [ ] appears in the original patent but forms no part of this reissue specification; matter printed in italics indicates the additions made by reissue.

BACKGROUND AND SUMMARY OF THE INVENTION

The present invention relates to the general class of toys wherein a powered vehicle traverses a trackway. More particularly, the trackway of the present invention is provided with a station section which includes upstanding walls provided with supporting surfaces that are parallel to the base and then slope downwardly toward the base. The powered vehicle has wheels which move along the trackway, and flanges which extend outwardly from the sides thereof. A plurality of covers of varying configuration are designed to both slide along the station section and to fit over the vehicle. To accomplish the foregoing, each of the covers is provided with flanges which extend outwardly therefrom and which are positioned apart from each other a distance such that the flanges engage the supporting surfaces of the sidewalls of the trackway and as well the flanges of the vehicle. Thus, as the vehicle enters the station section the cover carried thereby is deposited on the supporting surfaces of the upstanding walls of the station section, afterwhich the powered vehicle moves under the intermediate cover, and then engages the last cover which is positioned along the downwardly sloping supporting surfaces thereafter carrying this cover around the trackway, afterwhich this procedure is repeated time and time again for each of the covers.

DESCRIPTION OF THE PREFERRED EMBODIMENT

Figures 1, 2, 6, 7, 8, 9:
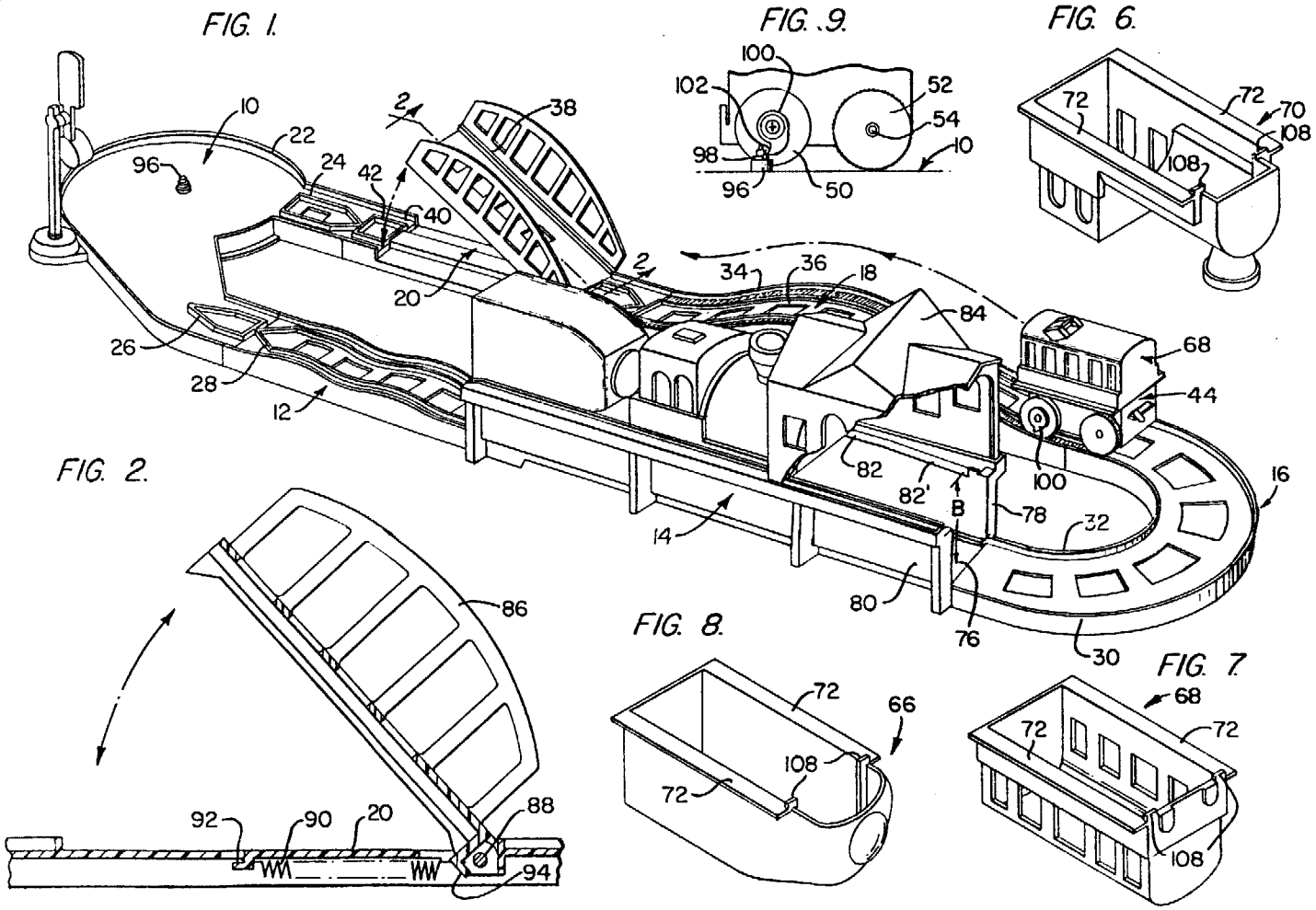
FIG. 1 is a perspective view of the toy train and trackway of the present invention illustrating the various sections of the trackway, including the station section along which the vehicle covers are lined, the bridge section and the turning section.
FIG. 2 is a sectional view taken along line 2—2 of FIG. 1, illustrating the bridge in raised position.
FIG. 6 is a perspective view of one of the vehicle covers, illustrating the outwardly extending flanges which are designed to rest upon both the supporting surfaces of the station section and the flanges of the powered vehicle, and the abutments extending downwardly therefrom which engage corresponding abutments formed at the end of the downwardly sloping supporting surfaces of the station section so as to permit the powered vehicle to move underneath the aligned vehicle casings while retaining the casings on the station section.
FIG. 7 is a perspective view illustrating the bottom configuration of another of the casings.
FIG. 8 is a perspective view illustrating the bottom configuration of still another of the casings.
FIG. 9 is a side elevational view of a portion of the powered vehicle and the turning section, illustrating the interaction between the cam which is affixed to the front left wheel of the vehicle and the surfaces of a spiral groove formed in a post positioned in the center of the turning section which permit the vehicle to circle the turning section before leaving same to continue its movement along the trackway.

The amusement device of the present invention, as illustrated in FIG. 1, consists of a trackway having a turning section 10, a straight section 12, a station section 14, a turn around section 16, an elevated section 18, and a bridge section 20. Appropriate wall structure generally designated by the reference numerals 22, 24, 26, 28, 30, 32, 34, 36, 38, 40, and 42 is provided within the sections 10, 12, 16, 18, and 20 to define a continuous path along which a powered vehicle 44 travels.

Figure 5:
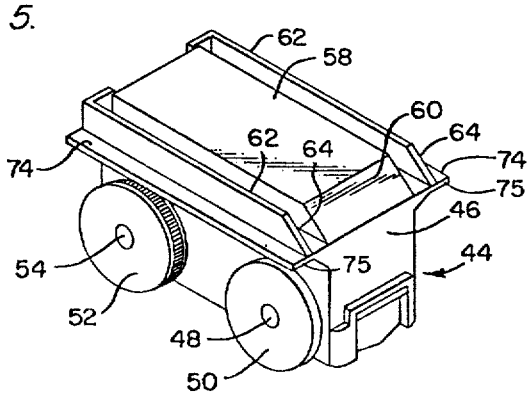
FIG. 5 is a perspective view of the powered vehicle, illustrating the flanges extending outwardly from the sides thereof upon which the corresponding flanges of the vehicle covers rest, and the front beveled edges which are responsible for gently raising the vehicle covers from the supporting surfaces permitting the vehicle to pass underneath the covers.

As illustrated in FIG. 5, the vehicle 44 consists of a chassis 46 through which a shaft 48 extends to which the front wheels 50 are mounted such that the wheels 50 are free to rotate as the vehicle 46 moves along the trackway. A miniature motor, which may be battery powered or of the wind-up variety, well known in the prior art, is enclosed within the chassis 46 and arranged to drive the rear wheels 52 which are mounted to an axle 54 extending through the chassis 46. The top of the chassis 46 is provided with an upstanding central portion 58 having a front beveled surface 60, and side portions 62, each of which includes a front beveled surface 64.

Three or more vehicle casings designated by the reference numerals 66, 68, and 70, as illustrated in FIGS. 6–8, are constructed to fit on top of the powered vehicle 44. The vehicle casing 66 is designed to resemble a high speed train engine, the vehicle casing 68 is designed to resemble an electric engine, and the vehicle casing 70 is designed to resemble a wood burning engine.

It will be apparent that each of the vehicle casings 66, 68, and 70 are provided with outwardly extending flanges 72 which are constructed to rest upon the corresponding flanges 74 which extend outwardly from the top of the chassis 46 of the powered vehicle 44.

The station section 14 consists of a base 76 along which the vehicle 44 travels, and sidewalls 78 and 80 which extend upwardly from the base 76 and which include on the insides thereof shoulders provided with supporting surfaces 82 which are spaced apart from each other such that the flanges 72 of the vehicle casings 66, 68, and 70 may rest upon the surfaces 82. It can be seen from FIGS. 1 and 3 that the supporting surfaces 82 terminate in surfaces 82' that slope downwardly in the vicinity of the station house 84 which is positioned at the end of the section 14.

As illustrated in FIG. 2, the section 20 is provided with a bridge 86 which is mounted to rotate about a shaft 88 which is journalled within the section 20, and a spring 90, having one end fastened to an abutment 92 on the section 20 and the other end thereof attached to a flange 94 extending from the bridge 88, which normally urges the bridge 86 into raised position.

As illustrated in FIGS. 1 and 9, the turning section 10 is provided at the center thereof with an upstanding post 96 having a spiral groove formed therein defining a supporting surface 98. Affixed to the left front wheel 50 of the powered vehicle 44 is a cam 100 provided with a stepped surface 102 ending in a tip as shown. The interrelationship between the tip of cam 100 and the surface 98 of the spiral groove on the post 96 will be explained hereinafter.

Figure 3:
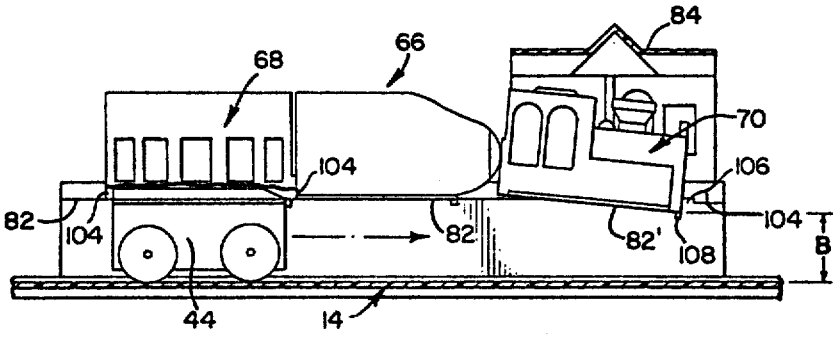
FIG. 3 is a side elevational view partly in section illustrating the powered vehicle after it has entered the station section and moved under the first of the vehicle covers.
Figure 4:
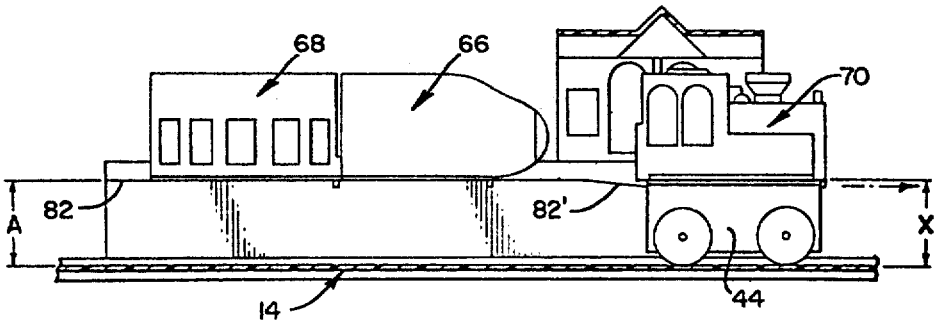
FIG. 4 is a side elevational view partly in section illustrating the powered vehicle after it has moved under the intermediate cover, engaged the third cover, and moved same from the station section for transportation along the trackway.

After the vehicle casings 66, 68 and 70 are positioned along the supporting surfaces 82 of the station section 14, the motor within the vehicle 44 is activated causing the vehicle 44 to move forwardly along the trackway. Eventually, the beveled surfaces 60 and 64 of the vehicle 44 strike the rear wall 104 of the first of the vehicle casings that are lined up on the station section 14. As illustrated in FIG. 3, for example, engagement of the beveled surfaces 60 and 64 against the rear wall 104 of the vehicle casing 68 permits the vehicle 44 to raise the casing 68 upwardly and thereafter move under the casing 68, afterwhich the beveled surfaces 60 and 64 engage the rear wall 104 of the vehicle casing 66 raising momentarily the casing 66 to permit the vehicle 44 to continue its movement along the section 14. Eventually, the vehicle 44 reaches the last casing 64 which is resting in a downwardly inclined position on the supporting surfaces 82'. Note that abutments 106 that are formed at the end of the walls 78 and 82 engage the front ends of the side flanges 72 which extend outwardly from the vehicle casings for retaining the respective casings 66, 68 and 70 in position as the vehicle 44 moves forwardly along the station section 14. Eventually, the front portions 75 of the flanges 74 of the forward vehicle 44 engage the downwardly extending flanges 108 and the vehicle 44 is positioned within the vehicle casing 70, raising the vehicle casing 70 and the flanges 72 above the abutments 106 of the walls 78 and 80 thus permitting the vehicle 44 with the casing 70 positioned thereon to leave the station section 14, as illustrated in FIG. 4. [of] *Of* course the abutments 106 must be of such a height to permit this action to take place. The vehicle 44 then carries the casing 70 around the trackway and eventually deposits same at the rear of the station section 14, afterwhich the procedure enumerated above is repeated. Thus, each time the vehicle 44 approaches the station 14 it deposits a casing that it has carried onto the front end of the station 14, at which time the flanges 72 extending outwardly from the casing rest on the supporting surfaces 82 of the walls 78 and 80. The vehicle 44 continues to move underneath the remainder of the casings until reaching the last of the casings which has its flanges 72 resting on the downwardly inclined supporting surfaces 82', at which time the vehicle 44 engages this last casing and carries same along the trackway.

Of course, for the above operation to function as described the distance A between base 76 and the portions 82 of the supporting surfaces of the sidewalls 78, 80 that are parallel to the base is greater than the distance between the bottoms of wheels 50, 52 and flanges 74 of the powered vehicle 44 such that when the vehicle and the respective covers are in that portion of the station section wherein the supporting surfaces 82 are parallel to the base 76, the flanges 74 of the vehicle are positioned below the flanges 72 of the cover.

The front of vehicle 44 is provided with beveled surfaces 60, 64 such that as the vehicle travels along the station section the beveled surfaces engage the covers that are resting on the portions 82 of the supporting surfaces that are parallel to the base raising the respective covers in turn as the vehicle passes underneath thereof.

Abutments 106 are formed at the ends of the portions 82' of the supporting surfaces that slope downwardly for engaging the front ends of flanges 72 of the respective covers. The distance B between the ends of portions 82' of the supporting surfaces that slope downwardly and the base is less than the distance X between the bottom of wheels 50, 52 and the flanges 74 of the powered vehicle such that when the vehicle is at the end of station section 14 the flanges of the vehicle engage the flanges 72 of the associated cover raising same above abutments 106 and permitting the vehicle and cover to leave the station section.

From FIGS. 1 and 2, it will be apparent that as the vehicle 44 enters the section 20 the bridge 86 is lowered by the weight of the vehicle 44 against the force of the spring 90. After the vehicle 44 leaves the section 20 the bridge 86 rises once again. Thereafter, the vehicle 44 enters the turning section 10, at which time the cam 100 on the left front wheel 50 engages the post 96. The engagement of the cam 100 and the post 96 causes the vehicle 44 to circle the post 96 during which time the tip of surface 102 of the cam 100 rises along the supporting surface 98 of the spiral groove on the 96. When the tip of surface 102 of the cam 100 reaching the uppermost part of the supporting surface 98, the cam 100 is released from the post 96 thus permitting the vehicle to leave the turning section 10 to enter the section 12.

Of course, the cam 100 is suitably spaced from the left front wheel 50 of the powered vehicle 44 so that the wheel will not engage or bind on post 96 as the vehicle circles around post 96 when the vehicle is in the turning section 10.

I claim:

1. A toy train and trackway, comprising:

a trackway provided with a section having a base and upstanding side walls opposite one another on respective sides of said trackway, supporting surfaces provided on said walls which include portions that are parallel to said base and portions that slope downwardly from said parallel portions toward said base, a powered vehicle provided with wheels that move along said trackway and said base of said section, and flanges extending outwardly from said vehicle; and a plurality of covers for said vehicle, each of said covers provided with flanges extending outwardly therefrom for engaging said supporting surfaces of said side walls of said section and said flanges of said vehicle, said vehicle and trackway being constructed and arranged so that said vehicle, moving over said trackway, can go underneath and completely pass one of said covers as the latter is maintained on said parallel portions, but can go under and pick up one of said covers that is present on said downwardly sloping portions.

2. A toy train and trackway as in claim 1, wherein the distance between said base and those portions of said supporting surfaces of said sidewalls that are parallel to said base is greater than the distance between the bottoms of said wheels and said flanges of said vehicle such that when said vehicle and said covers are in that portion of said section wherein said supporting surfaces are parallel to said base said flanges of said vehicle are positioned below said flanges of said cover, and wherein the front of said vehicle is provided with a beveled surface such that as said vehicle travels along said section said beveled surface engages said covers that are resting on said portions of said supporting surfaces that are parallel to said base raising said covers.

3. A toy train and trackway as in claim 2, further comprising abutments formed at the ends of said portions of said supporting surfaces that slope downwardly for engaging the front ends of said flanges of said covers, and wherein the distance between the ends of said portions of said supporting surfaces that slope downwardly and said base is less than the distance between the bottoms of said wheels and said flanges of said vehicle such that when said vehicle is at the end of said section said flanges of said vehicle engage said flanges of said cover raising same above said abutments permitting said vehicle and said cover to leave said section.

4. A toy train and trackway as in claim 3, further comprising a second section within said trackway, a bridge mounted to move with respect to said second section between raised and lowered positions, and spring means normally urging said bridge to said raised position.

*5. An amusement device, comprising:*

*a trackway including an elongated station having two ends,*

*a vehicle chassis having wheels for rolling said chassis along said trackway and through said station via the ends thereof,*

*a plurality of bodies each adapted to be deposited on and removed from said chassis, and*

*body exchange means for replacing a first body carried by said chassis with a second body previously positioned at said station, said body exchange means including means for removing said first body from said chassis when said chassis enters said station by supporting said first body on said station adjacent the end thereof that said chassis enters, and means for depositing said second body on said chassis when said chassis exits said station by lifting said second body from said station adjacent the end thereof that said chassis exits.*

*6. An amusement device as in claim 5, wherein said means for depositing said second body comprises surfaces associated with said station adapted to support said second body and including inclined portions positioning said second body thereon in an inclined position, retaining means for preventing said second body on said inclined portions from moving therealong, and means associated with said chassis upon engagement with said second body on said inclined portions for raising one end of said second body thereby permitting said chassis to move into engagement with said second body and thereafter raising the other end of said second body out of association with said retaining means to thereafter permit said second body to travel with said chassis along said trackway, said movement of said chassis through said station being continuous.*

*7. An amusement device as in claim 5, wherein said means for removing said first body comprises surfaces associated with said station adapted to support said first body, and means for retaining said first body at a predetermined position on said surfaces as said chassis moves continuously along said trackway through said station.*

*8. An amusement device as in claim 6, wherein said means associated with said chassis upon engagement with said second body for raising one end thereof comprises a downwardly sloping wall formed at one end of said chassis positioned to engage the lower portions of said bodies when said bodies are at said station.*

*9. An amusement device as in claim 6, wherein said retaining means for preventing said second body from moving along said inclined portions comprises at least one abutment formed at the end of one of said inclined portions and extending upwardly therefrom.*

*10. An amusement device as in claim 6, wherein said station comprises a base along which said chassis travels and upstanding sidewalls opposite one another on respective sides of said base, said surfaces being formed in said upstanding sidewalls.*

*11. An amusement device as in claim 7, wherein said station comprises a base along which said chassis travels and upstanding sidewalls opposite one another on respective sides of said base, said surfaces being formed in said upstanding sidewalls.*

*12. An amusement device as in any one of claims 5, 6, 7, 8, or 9, wherein said vehicle chassis is provided with an internal motor operationally connected to at least one of said wheels.*

*13. An amusement device as in claim 5, wherein said bodies are configured to simulate the top portion of a vehicle.*

*14. An amusement device as in claim 13, wherein said bodies are three in number and configured to simulate different train engines.*

*15. An amusement device, comprising:*

*a chassis including means for propelling said chassis along a path, wherein said chassis has an axis disposed substantially parallel with respect to its direction of travel as it is propelled along said path, wherein said chassis has flanges extending outwardly from said chassis below the top thereof, and wherein said means for propelling said chassis includes wheels, means mounting said wheels to said chassis for rotation, a motor within said chassis, and means operatively connecting at least one of said wheels to said motor;*

*a plurality of bodies, each configured to be deposited on and removed from said chassis and having supporting surfaces provided thereon for engaging said flanges of said chassis and hollow portions encompassing the portion of said chassis above said flanges, each of said bodies simulating the top portion of a vehicle and having a front end and a back end with an axis running through the front and back ends; and*

*means for depositing one of said bodies on said chassis with the axis of the one of said bodies being substantially parallel to the axis of said chassis so that said chassis and said one of said bodies can move in unison along said path, and thereafter removing said one of said bodies from said chassis and substituting another of said bodies therefor with the axis of said other of said bodies being substantially parallel to the axis of said chassis so that said chassis and said other of said bodies can move in unison along said path.*

* * * * *